Nov. 26, 1968 G. E. THIBAULT 3,412,651

METHOD OF INSERTING HANDLES INTO CARDBOARD BOXES

Filed Dec. 11, 1967 4 Sheets-Sheet 1

INVENTOR.
GEORGE E. THIBAULT
BY
Barlow & Barlow
ATTORNEYS

METHOD OF INSERTING HANDLES INTO CARDBOARD BOXES

Filed Dec. 11, 1967

4 Sheets-Sheet 2

INVENTOR.
GEORGE E. THIBAULT
BY
Barlow & Barlow
ATTORNEYS

INVENTOR
GEORGE E. THIBAULT
BY
Barlow & Barlow
ATTORNEYS 3,412,651

METHOD OF INSERTING HANDLES INTO CARDBOARD BOXES

George E. Thibault, Somerset, Mass., assignor to Slater Paper Box, Inc., a corporation of Massachusetts Continuation-in-part of application Ser. No. 521,040, Jan. 17, 1966. This application Dec. 11, 1967, Ser. No. 691,112
5 Claims. (Cl. 93—36)

ABSTRACT OF THE DISCLOSURE

A method and means for inserting cardboard handles into walls of cardboard boxes in which the ends of the handle are inserted into preformed slits in a cardboard box blank.

*Cross references to related applications*

This application is a continuation-in-part of my application Serial No. 521,040, filed Jan. 17, 1966, now abandoned, for Method of Inserting Handles Into Cardboard Boxes.

*Background of the invention*

This invention relates to the manufacture of cardboard boxes and more particularly to a type of cardboard box which is utilized as a man's suitbox or a lady's dress box and one which is used in the clothing retail trade. In the manufacture of these boxes it is desirable that they have an integral handle to facilitate a customer in carrying the same. From the manufacturing standpoint of producing such a box, it is desirable that the processing be done on a continuous basis so that once the cardboard stock enters the machine it will not stop until it comes out in finished form ready to be shipped to the retail store. In the past it has been customary to process cardboard box blanks on an intermittent feed type of apparatus for the cardboard box blank would stop at a number of stations and be suitably processed in sequential fashion at each station. With intermittent motions of this nature it will be obvious that the processing of any device, including a cardboard box, is noticeably slow because of the delays that take place between each station. It is desirable, therefore, that the production of any given machine be high for the length of the time the machine is in operation, and accordingly, continuous processing of box blanks is important to a box manufacturer.

*Summary*

This invention provides a method of attaching a handle to a cardboard box while the box blank is in continuous linear motion and accepts a plastic or cardboard type of handle. If a cardboard type of handle is utilized, the present invention provides means for pre-folding the handle before the same is inserted into slots that have been cut into the box blank.

*Description of the preferred embodiments*

Figure 1:
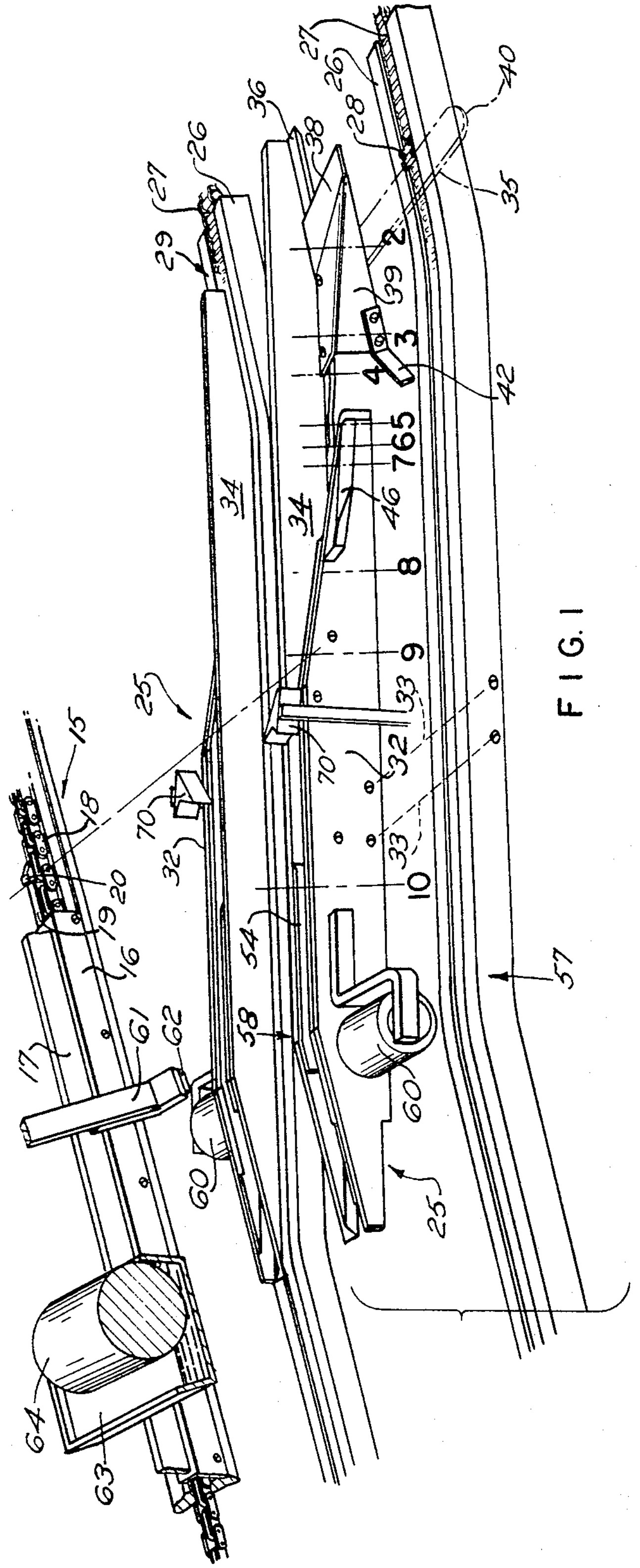
FIG. 1 is a perspective view of a fragmental portion of a box blank assembling machine with the bracketed portion exploded, illustrating apparatus for performing the method of this invention.

Referring now more particularly to the drawings, there is shown in FIG. 1 a fragmentary portion of a box blank machine which consists of a guiding and feeding means generally indicated at 15 which serves to guide the box blank across the station which inserts the handles into preformed slots in the box blank. Basically, this guiding means consists of an inverted L-shaped plate 16 having a retaining rail 17 located immediately above and spaced from the upper surface of the horizontal portion of the plate 16. The box blank is adapted to pass between the parts 16 and 17 and is moved longitudinally between these parts by means of a roller chain 18 which has affixed to the sides thereof at spaced intervals dogs 19 with protruding portions 20 extending above the plate 16 that engage the rear edge of the box blank. An identical assembly that is a mirror image of the assembly shown is located on the other side of the handle inserting station. It will be understood that the chain 18 moves at the proper speed to advance the box blank continuously with reference to the handle inserting station which station basically comprises a pair of folding rails 25 which are mounted for association with handle feed rails 26. The feed rails 26 have roller chains 27 guided therein, there being affixed to the roller chain at spaced intervals feed dogs 28 which serve to engage the trailing edge of the handle and move the same through the folding rails. An entrance portion for the handle is therefore had between the feed rails 26 and the end of the folding rails 25 as generally indicated at 29.

Figure 2:
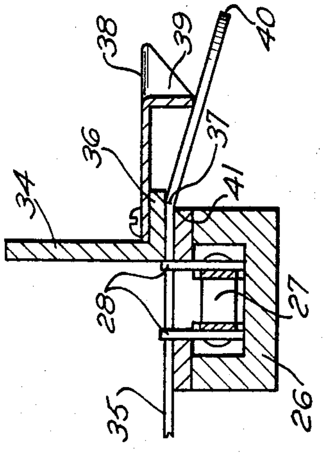
FIGS. 2 through 10 are sectional views taken through the folding apparatus at a number of stations in a sequential arrangement showing the manner in which the handle is folded for insertion into the box blank.
Figure 3:
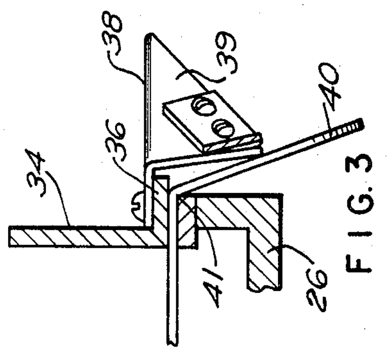
Figure 4:
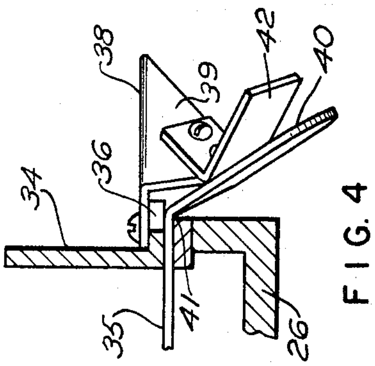

Each of the folding rails is substantially identical, and therefore, the description of one which is a mirror image of the other will be used herein. The rails are made up of two spaced plates 32 and 34 which are fastened to the feed rails 26 as by fasteners depicted by the dotted lines 33 so as to be integral therewith, the precise relationship being better illustrated in the sectional views, FIGS. 2 through 8. To the plates 32 and 34 there are attached various fixtures which serve to process the handle blank as it moves through the rails from one end to the other. Through means that are not shown handle blanks are fed one at a time to the feed rails 26 and are engaged by dogs 28 attached to the roller chain 27 so that each handle moves in timed relationship to a box blank which will be guided on the means generally indicated at 15. The handle blank which is indicated at 35 (FIG. 2) is guided on top of the rails 26 and the top side thereof makes engagement with the underside of the folding rail 34 and particularly an outwardly turned lip 36 (see FIG. 2). This relationship serves to firmly grip the handle across the thickness thereof. Under some circumstances it may be desirable at this point to establish an outer crease line as at 37 and thus as the handle blank moves along, it may engage the terminal end of a bending plate 38 which is provided with a downwardly extending lip portion 39. The edge of the lip is angularly oriented relative to the feed rail 26 such that the terminal end portion of the handle 35 as at 40 will continue to be bend downwardly and about the edge 41. As will be seen in the next successive view FIG. 3, the terminal end portion 40 of the handle has been bent down to nearly a right angle since not only does the lip portion 39 become deeper with relationship to the top edge of the feed rail 26 but also is turned inwardly so it effectively approaches the rail 26 at an acute angle. Thus, by the time the terminal end portion of the blank has left the forming plate 38 a substantial fold will have been made. The terminal end 40 then proceeds to be engaged by the finger 42 (FIG. 4) which assists in maintaining the terminal end 40 in a folded condition as will be seen, for example, in FIG. 5.

Figures 5, 6, 7:
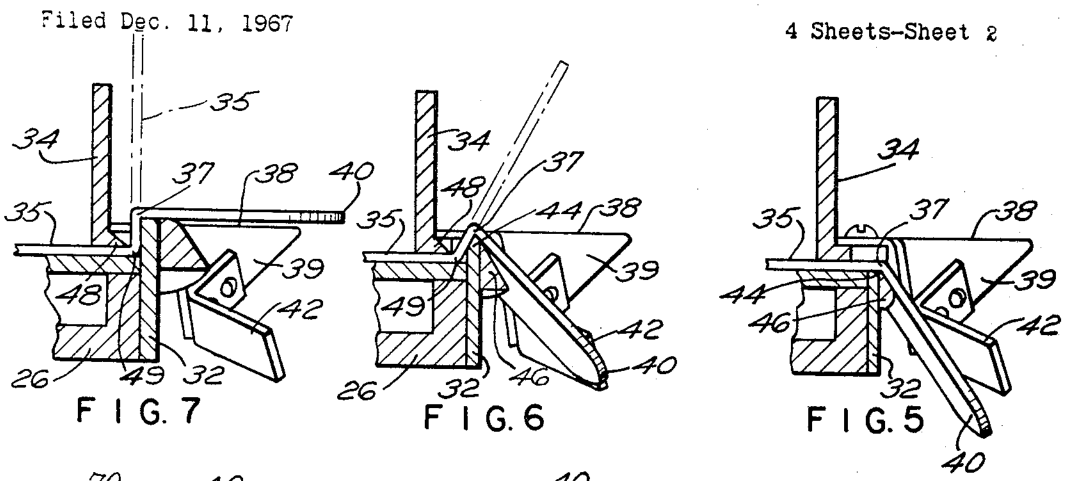
Figures 8, 9, 10:
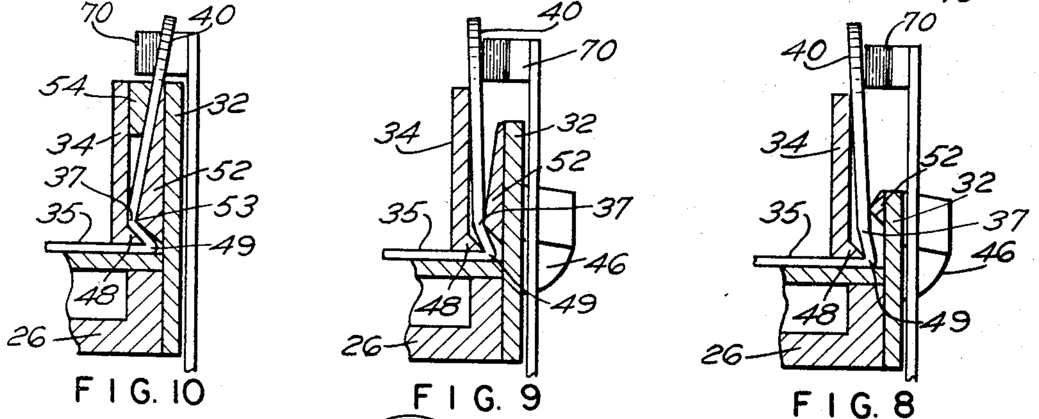

The creased portion at the crease line 37 is picked up by a portion of the rail 32 as at 44 while the underside of the terminal end portion 40 is guided by a protrusion 46. As this fold line is raised, the handle portion inwardly of the terminal end portion is held in position by a foot 48 of the rail 34. Thus, as the fold line is raised, creasing will occur as at 49. As the handle progresses down the rail, the terminal end portion 40 is now finally free of the finger 42 as shown in FIG. 7, and the terminal end portion 40 may now more or less assume a horizontal position, the second fold line 49 which is in opposite direction of the first fold line 37 having now been completed, in this position it will be noticed that there is no upper restraining means preventing the terminal end portion of the handle from moving in an upward direction, and accordingly, the upper edge of the forming plate 32 rises gradually from a level such as shown in FIGS. 6 and 7 and as depicted in FIGS. 8 through 10 additionally an inward bulge as at 52 begins to press the terminal end portion 40 in an upward direction and this bulge 52 from its inception as shown in FIG. 8, slowly enlarges as shown in FIGS. 9 and 10 to finally become a full forming member as shown in FIG. 10. Additionally, to properly laterally orient the terminal end portion 40, the forming plate 34 has a protuberance 54 thereon so that this taken together with the bulging 52 accurately aligns the terminal end portion 40 for insertion.

Figures 11, 12, 13:
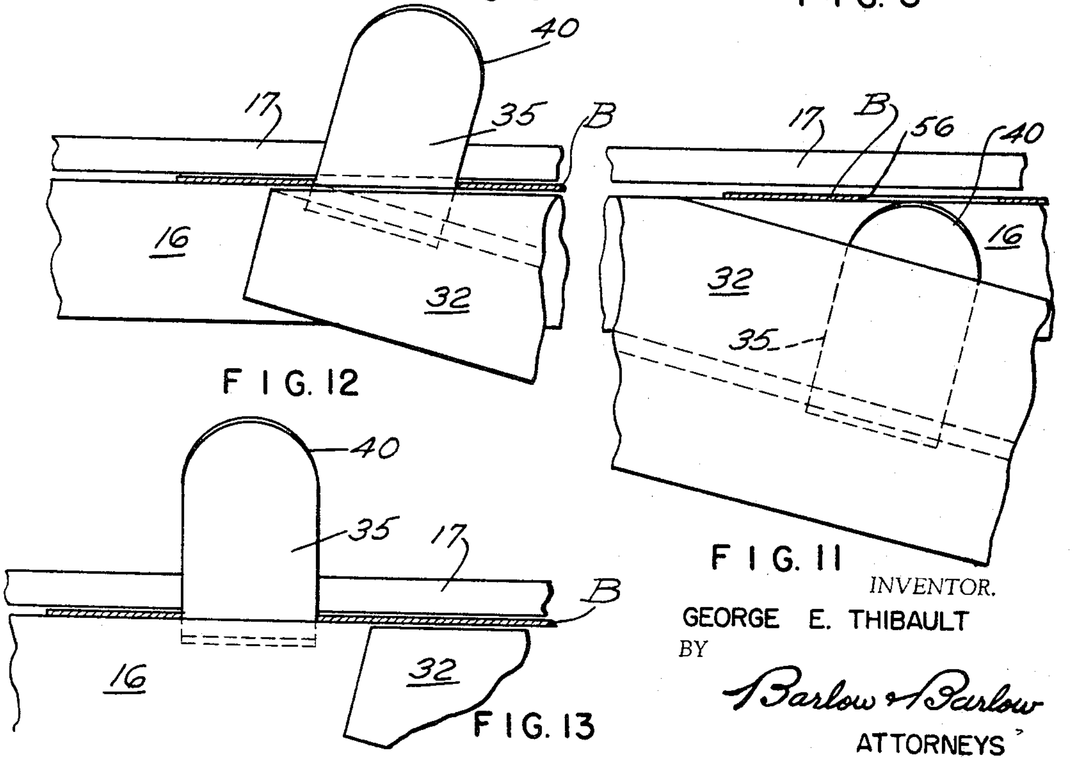
FIGS. 11 through 13 are sectional views taken from the right side of the views of FIGS. 2 through 10 showing the final insertion stages.

From a relative standpoint the handle has been proceeding in a gradual upward direction as fed on the gradually rising rails 26, and in the position of FIG. 10 is placed in close proximity to a slit 56 in the box blank B as depicted in FIG. 11. The handle continues to move upwardly on the rails 26 and as shown in FIG. 12 has progressed to a point where the terminal portion 40 has entered the slit 56 to practically its full extent. At this portion the forming rails 34 and 32 as well as the feed rails 26 take a sharp bend to become parallel to the blank guide rails, which point is shown in the area depicted by the arrow 57 (FIG. 1) on the feed rails and the point 58 on the forming bars. As parallelism is achieved, the terminal end 40 of the handle is now fully inserted.

At a point just prior to the insertion of the terminal end 40 of the handle into the slit 56 of the box blank, there are located a pair of rollers 60 (FIG. 1) which serve as pressure points to cooperate with a pair of glueing arms such as the arm 61 that has affixed to the end thereof a glue pad 62. A glue arm 61 is timed to rotate so that it will contact the box blank immediately adjacent the slit 56. It applies glue to the box blank in the usual fashion, there being provided a glue pot 63 with a glue roller 64 rotatable therein, the arm 61 striking the roller 64 and picking up a small amount of glue on the pad 62 during each revolution of the arm 61. In this fashion as the terminal end 40 of the handle is folded (in a manner to be described) so as to be in contact with the box blank after insertion, the glue will secure the handle to the box blank.

Figures 14, 15, 16, 17:
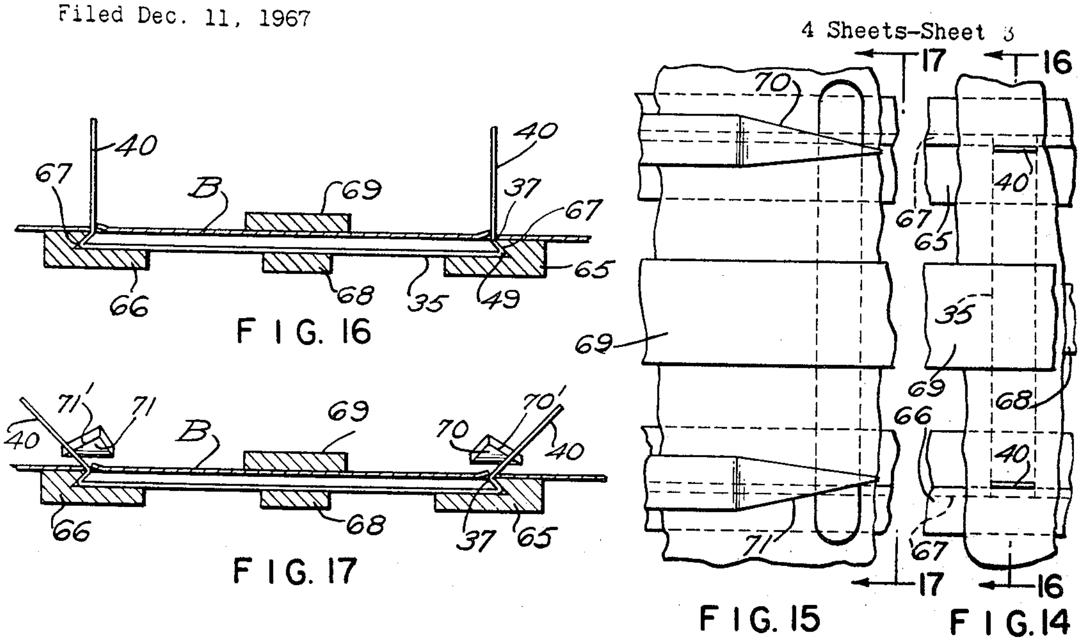
FIGS. 14 and 15 are broken plan views of the box blank and handle in successive stages after leaving the folding rails.
FIGS. 16 and 17 are sectional views taken on lines 16—16 and 17—17 of FIGS. 14 and 15 respectively.

As the inserted handle leaves the forming rails 25, a portion thereof which includes the fold line 49 up to the fold line 37 is grasped by a pair of rails 65, 66 which have dovetail facing slots 67 therein. These slotted sections, as will be seen more particularly in FIG. 16 of the drawings, firmly maintain in proper oriented position the grasping portion of the handle 35 which is maintained in substantial planal relationship by a support bar 68. Similarly a guide shoe 69 engages the box blank B so that all elements which are adjacent the handle are held against deflection. As the box blank moves along, a pair of upper forming members 70 and 71 are positioned in the path of the terminal ends 40 of the handle. These forming rails each have inclined edges 70′ and 71′ which extend not only at an angle to the longitudinal extent of the box blank but also have their entering portion raised from the horizontal. In this fashion the terminal ends 40 are engaged by the edges 70′ and 71′ and bent downwardly towards a position to be more nearly parallel the extent of the box blank B. During this operation more of a fold is created at fold line 37 and the forming bars 68 and 69 maintain this position of the terminal end 40 until immediately prior to the box blank being pressed between two sets of rolls.

Figure 18:
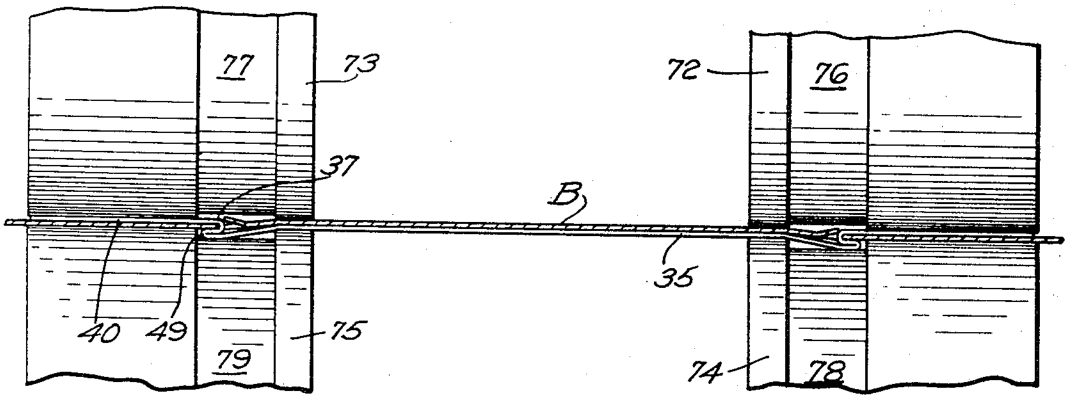
FIG. 18 is a front elevation view, partly in section, showing pressing rolls.
Figure 19:
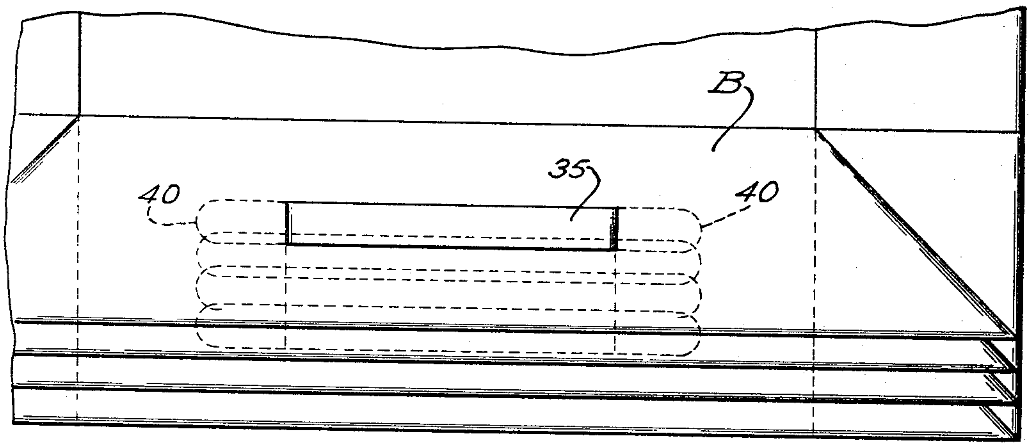
FIG. 19 is a plan view showing stacked box blanks at the end of the machine.

Referring now to FIG. 18, it will be seen that there is provided an upper pair of rolls 72 and 73 which are adapted to mate respectively with a lower set of rolls 74 and 75. Each of the rolls is provided with a grooved section, there being grooved sections 76, 77, 78 and 79 respectively, with grooved sections 76 and 78 in cooperative alignment as is the alignment in grooved sections 77 and 79. The box blank and the handle are passed through these rolls so that the folded portion of the handle which is now reversely bent about fold lines 37 and 49 will pass in the grooved areas while contact will be made by the surface of the rollers 72, 73, 74 and 75 squeezing the terminal end portion 40 down into contiguous relationship with the box blank B. Normally the adhesive that is used to secure the terminal end portion of the handle to the box blank does not set up sufficiently fast so that the terminal end portion 40 will remain adhesively secured to the box blank. However, the adhesive which has been previously applied to the box blank will now also be applied to the terminal end portion 40 of the handle. Further processing of the box, that is by folding the ends to provide end walls and certain other operations may then take place and at the terminal end of the folding machine, the box blanks are stacked as depicted at FIG. 19 and are held in this position by a flexible belt pressing them together so that at this point the terminal end portion 40 will become adhesively secured to the box blank and will remain in that position such as depicted in FIG. 19 for a sufficiently long time so that the adhesive will set. This whole action is enhanced by the fact that the adhesive is applied to both pieces to be secured at the station depicted in FIG. 18, and thus, this assures that the terminal end portion 40 will be properly secured to the box blank B.

As has been mentioned previously, in some cases it is not necessary to establish the outer crease line during the initial movement of the handle 35 into the folding rails; for example, if the thickness of the handle stock is such that easy creasing may be had, then the outer crease line may be left to later processing. In this alternate form, therefore, it should be considered that the bending plate 38 has been eliminated together with the operations which are described in connection with FIGURES 2 through 6. In dotted line, the position of the terminal end of the handle has been shown in FIGURES 6 and 7 as it would proceed in connection with this modification, there having been established at this point only one fold as at 49. As has been mentioned previously, the bulge 52 enlarges progressively as shown at different locations in FIGS. 8 through 10 and this bulge becomes effectively a forming plate to create the fold at 37, the fold being effectively completed at the station 10 where the apex of the forming plate 52, as at 53, is in alignment with the crease 37. Also it will be noted at FIG. 10 the necessity of providing the protuberance 54 which insures that an actual crease will be established.

Under some conditions of operation it has been found that the two ends 40 of the handle do not move up the feed rails 26 at the same speed in spite of the fact that feed dogs are present. This comes about due to the change of frictional engagement of the handle between the forming rails and can therefore result in some cocking of the handle from its normal perpendicular orientation to the feeding rails. Thus, to insure that the handle is properly oriented immediately prior to insertion through the slits 56 of the box blank, a pair of fingers 80 (FIG. 1) move in timed relationship on a slightly accelerated basis to strike the terminal end 40 of the handle as shown in FIG. 10 and insure that each terminal end 40 is in the same position longitudinally of the rail just prior to insertion. It will be appreciated that the timing of the fingers 80 is such that the ends 40 must pass by before being struck and this operation is permitted by the wedge shape of the fingers 80 as seen in FIG. 1.

It will therefore be seen that I have a novel method of folding and inserting a handle into a cardboard box, the handle assuming the configuration as shown in my U.S. Patent No. 2,981,458. It will further be appreciated that the mechanism which is described herein automatically limits the amount of insertion of the terminal end 40 of the handle into the box and obviates the necessity of having ears 23 on the handle such as were originally shown in my above referenced patent.

Figure 22:
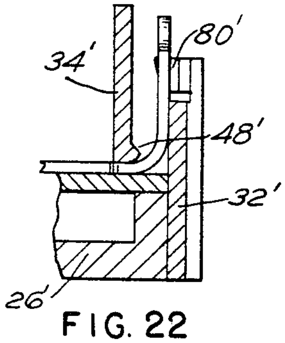
FIGS. 20 through 22 are sectional views taken through the guiding apparatus at a number of successive stations showing the manner in which a plastic handle is put into position for insertion into the box blank.
Figure 21:
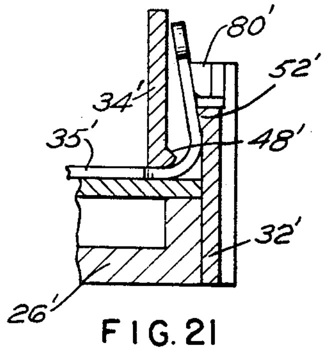
Figure 20:
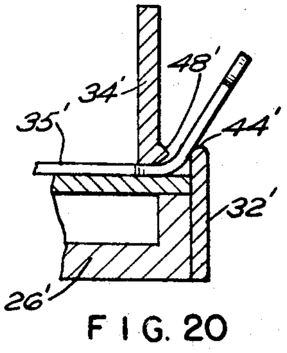

Referring now to FIGS. 20 through 28 of the drawings, I have shown therein a slightly modified form of the invention in which pre-molded plastic handles having T-shaped ends are adapted to be fitted into the slits that are formed into the box blank. With specific reference to the drawings, guiding rails similar to the guiding rails of the previous embodiment are employed. In this case, however, the guiding rails are not provided with folding means in the same sense as the previous embodiment, and to this end consist substantially of a pair of plates 32′, 34′ which are mounted in spaced relationship on top of the feed rails 26′. As is shown in FIGS. 20 to 22, the handle blank 35′ is fed on top of these rails as in the preceding embodiment, and as it moves up the rails, the inclined edge of the plate 32′ as at 44′ raises the terminal end of the handle while the inner plate 34′ which has a foot 48′ holds the handle against the feed rails 26′. In the next sequential view shown at FIG. 21, it will be noted that the upper edge of the plate 32′ has risen gradually from the level as shown in FIG. 20 and additionally an inward bulge as at 52′ has been created so as to overstress the bend of the handle 35′ which with certain types of plastics may be necessary to insure vertical orientation at insertion. As the handle continues upwardly, the bulge is removed and the handle assumes a position which is substantially normal to the plane of the box blank. The proper orientation is shown at FIG. 22, which view is taken to the right of the showing of FIG. 23, and further shows the finger 80′ moving into position to strike the terminal portion of the handle in timed relationship so that each terminal end is in the same position longitudinally of the rails 26′ just prior to insertion.

Figures 23, 24, 25, 26, 27:
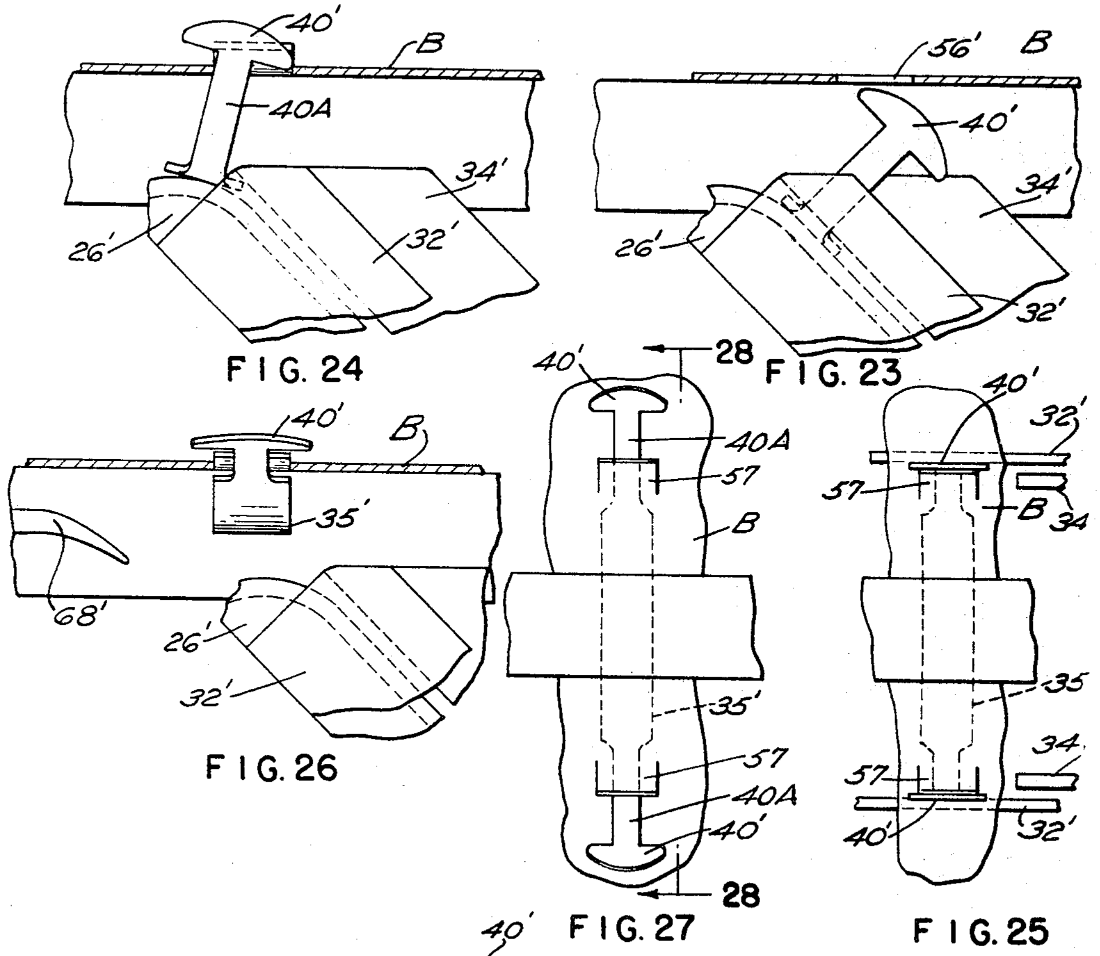
FIGS. 23, 24 and 26 are sectional views taken from the right hand side of the views of FIGS. 20 through 22 showing the final insertion stages of a plastic handle.
FIG. 25 is a broken plan view of a box blank with the plastic handle ends fully inserted and in the position just subsequent to the showing of FIG. 24.
FIG. 27 is a broken plan view similar to FIG. 25 showing the plastic handle after full insertion and in the general attitude of FIG. 26.
Figure 28:
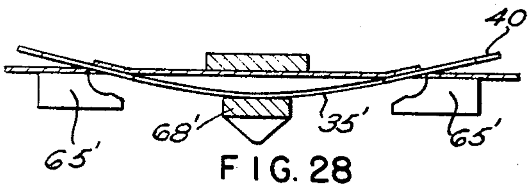
FIG. 28 is a sectional view taken substantially on line 28—28 of FIG. 27 illustrating the plastic handle in fully inserted position with the handle being guided.

As will be appreciated, the handle has been proceeding in a gradual upward direction as fed on the rails 26′ which rails in the present embodiment assume a steeper angle than the angle as illustrated in the previous embodiment. As will be seen by referring to FIG. 23, the angle of the rails is sufficient so that the leading tip of the T-shaped end 40′ of the handle will enter the slit 56′ of the box blank B and as the box blank B moves along, the leading tip will fully enter the slit pushing the flap 57 upward, and the shank portion, just below the T-shaped end as at 40A, will abut one edge of the slit 56′ (see FIG. 24) and permit the trailing edge of the T-shaped end 40′ to fully enter the slit. To this end the length of the slit is such that it will permit this entry by being dimension in a proportion as shown in FIG. 24 and immediately upon the handle leaving the rails 26′ the natural tendency of the plastic handle to return to the shape in which it was molded, namely in flat form, known as the plastic recovery characteristic, will attain, and the body of the handle will effectively move upwardly towards the box blank B forcing the ends 40′ outwardly as illustrated in FIG. 26. This will continue and as shown in plan in FIG. 27 will then assume the substantially contiguous relationship which is further enhanced as the box blank moves down the machine by virtue of the presence of a support bar 68′.

It will of course be apparent that no further operations upon this particular embodiment are necessary since the handle is now fully inserted and will remain in that position throughout further processing of the box blank by the box forming machinery.

I claim:

1. The method of folding and inserting a handle into a cardboard box comprising the steps of feeding a box blank with precut spaced slits therein in spaced relation and in unison with each handle, folding the terminal ends of the handle and maintaining the terminal ends in a position substantially at right angles to the longitudinal extent of the handle bringing the handle and box blank together whereby the terminal ends enter the slits and move into contiguous relationship to the box blank.

2. The method of claim 1 wherein the terminal ends of the handle are bent toward the box blank after entering the slits and are secured to the box blank.

3. The method of claim 1 wherein the terminal ends of the handle are advanced toward the box blank at an angle thereto.

4. The method of folding and inserting a handle into a cardboard box comprising the steps of feeding a box blank with precut spaced slits therein in spaced relation and in unison with each handle, folding the terminal ends of the handle in one direction to an acute angle, folding the handle inwardly of the first fold in the opposite direction and continuing the second fold by laying the portion between the fold lines into substantial contiguous relationship to the handle, while maintaining the terminal ends substantially at right angles to the longitudinal extent of the handle bringing the handle and box blank together whereby the terminal ends enter the slits bending the terminal ends toward the box blank while maintaining the substantial contiguous relationship of the portion between the fold lines and the handle, and securing the terminal ends to the box blank.

5. The method of claim 1 including the additional step of striking the edge of the terminal end of the handle prior to insertion into the box blank to insure proper alignment.

No references cited.

BERNARD STICKNEY, *Primary Examiner.*